United States Patent [19]
Coughran, Jr.

[11] 3,735,788
[45] May 29, 1973

[54] TREE HARVESTING APPARATUS

[75] Inventor: Samuel J. Coughran, Jr., Cedartown, Ga.

[73] Assignee: Rome Industries, Incorporated, Cedartown, Ga.

[22] Filed: Mar. 22, 1971

[21] Appl. No.: 126,838

Related U.S. Application Data

[63] Continuation-in-part of Ser. No. 782,626, Dec. 10, 1968, Pat. No. 3,572,411.

[52] U.S. Cl. .............. 144/309 AC, 144/2 Z, 144/3 D
[51] Int. Cl. ............................................. A01g 23/08
[58] Field of Search ................ 144/2 Z, 3 D, 309 AC

[56] References Cited

UNITED STATES PATENTS

| | | | |
|---|---|---|---|
| 3,491,810 | 1/1970 | Williams | 144/3 D |
| 3,542,099 | 11/1970 | Gibson | 144/3 D |
| 3,529,639 | 9/1970 | Herolf | 144/2 Z |
| 3,340,912 | 9/1967 | Williams et al. | 144/3 D |
| 3,493,020 | 2/1970 | Choat | 144/34 E |
| 3,542,100 | 11/1970 | Choat | 144/3 D |
| 3,595,284 | 7/1971 | Landers | 144/2 Z |

*Primary Examiner*—Gerald A. Dost
*Attorney*—Newton, Hopkins & Ormsby

[57] ABSTRACT

A tree harvesting apparatus including means for severing a standing tree adjacent the base allowing the severed tree to fall to the ground, means for grasping the severed tree and removing the tree, by skidding, to a remote location and means for traversing the felled tree trunk to remove limbs therefrom. The tree severing means includes an operable shear blade supported for movement between a retracted inoperable position to a forward tree shearing position. The tree grasping means includes a pair of arms movable from an open position to a position in engagement with the surface of the tree trunk. One operable delimbing means is on the tree harvesting apparatus includes a rotatable wheel means mounted thereon for contacting upper surface portions of the felled tree trunk. A second delimbing means includes severing means operatively associated with tree grasping means, with the severing means of the tree grasping means operable for contacting sides and lower portions of a felled tree trunk. The two delimbing means are operable for removing limbs from a tree trunk in response to a traversing movement of the delimbing means over the surface of the tree trunk. The tree harvesting apparatus includes means for effecting attachment thereof to a transport vehicle capable of providing the operative power to the tree shear means, for operating the tree grasping means, for providing the tree skidding movement and to provide the traversing movement of the delimbing means.

20 Claims, 8 Drawing Figures

INVENTOR.
SAMUEL J. COUGHRAN, JR.
BY
Newton, Hopkins, & Ormsby
ATTORNEYS

TREE HARVESTING APPARATUS

CROSS REFERENCE TO RELATED APPLICATIONS

This application is a continuation-in-part of my co-pending application, Ser. No. 782,626, filed Dec. 10, 1968, for a "TREE HARVESTER" and now U.S. Pat. No. 3,572,411.

BACKGROUND OF THE INVENTION

This invention relates to a tree harvesting apparatus utilizing a connectable power vehicle such as a crawler-type or rubber-type tractor wherein the apparatus is effective for severing standing trees, allowing the severed tree to fall to the supporting ground surface, removing the felled tree to a remote location and for removing the limbs from the trunk of the felled tree.

The logging industry requires the use of special crews for performing certain of the operations, particularly those such as felling, topping and delimbing, which conventionally are performed at or near the original site of the tree. In addition to the hazards involved in these operations and the inherent inefficiency of crew operations, delimbing and topping leave a residue of material which present potential dangers of insects and disease attacks, as well as fire hazards.

There have been numerous attempts to devise tree harvesting apparatus which will automatically perform the tree felling operations, tree topping and delimbing operations, and transport of the felled tree to a desired location. However, the prior art tree harvesting apparatus are often complex in construction and operation.

While some of the prior art tree harvesting apparatus have attempted to simplify the tree felling operation, these devices are unsatisfactory in that they do not provide means for removing the tree to a remote location or for removing limbs from the tree.

Still other complex mechanisms have been devised for removing limbs from a tree. However, these delimbing devices require the use of additional power lift tools or tree handling mechanisms for effecting a transfer of a felled tree to the delimbing apparatus.

In certain of the prior art tree harvesting apparatus, a mechanism has been operatively associated therewith for removing limbs from a tree prior to severing the tree, with means for thereafter severing the tree and transferring the tree to a transport vehicle. These prior art tree harvesting apparatus which perform a delimbing operation prior to severing the tree are extremely complex in nature, uneconomical to manufacture and unreliable in performance. Further, these types of tree harvesting apparatus are extremely large and incapable of being maneuvered in remote wooded terrains.

SUMMARY OF THE INVENTION

The above disadvantages of the prior art are overcome by the present invention which basically includes a frame support means having attachment elements whereby the frame support means can be attached to a transport vehicle capable of providing traversing movement thereof in a wooded terrain. The frame support means includes a reciprocating cutter shear blade which is operable between a retracted inoperable position and an extended cutting position. The frame support means includes a pair of arms movable between closed and open positions. The arms are operable in a closed position to furnish a backup element to the cutter assembly and operable in moving between the opening and closed position to serve as a tree grasping means to perform movement of a tree to a skidding operation. The tree grasping arms are also provided with serving means located thereon with the severing means detailed in location and design for removing limbs from a tree in response to axial displacement of a tree trunk through the passageway formed between the arms. The severing means on the tree grasping arms will engage and sever limbs from the sides and bottom portions of a felled tree trunk. An additional feature of the present delimbing means is the provision of a delimbing wheel operable for contacting and removing limbs from a tree trunk when moved over the upper surface portions of a felled tree trunk.

One embodiment of the delimbing wheel includes means for rotatably supporting the delimbing wheel on the same frame means which supports and effects movement of the tree severing means and the tree grasping means. A second embodiment of the delimbing wheel includes means for supporting the delimbing wheel on a vehicular transport means in a location spaced from the frame means supporting the severing means and tree grasping means.

It is therefore a primary object of the present invention to provide a method and apparatus for effectively severing a standing tree, skidding the felled tree to a remote location and removing limbs from the felled tree.

A further object of this invention is to provide an operable delimbing means which will effectively remove limbs from the surfaces of a felled tree trunk while lying on the ground.

A still further object of this invention is to provide a frame support means which will operatively support a tree severing means, a tree grasping means and a tree delimbing means.

Still another object of this invention is to provide a tree harvesting apparatus which includes a frame support means including attachment elements for attaching the frame support means to a vehicular transport means.

Yet another object of this invention is to provide a tree harvesting apparatus which includes an operable tree severing blade, an operable tree grasping means and an operable delimbing means, all of which are mounted on a single frame and operable independently of each other.

A further object of this invention is to provide a rotatable wheel means which will remove limbs from the tree trunk of a felled tree lying on the ground in response to a traversing movement of the wheel over the trunk of the felled tree.

Another object of this invention is to provide a delimbing wheel which includes means for adjusting the effecting delimbing dimensions thereof.

A further object of this invention is to provide a tree grasping means operable as a tree backup means in a tree severing operation, operable as a trunk engaging and grasping means for removing a tree to a remote location and operable as a delimbing means in a delimbing operation.

A still further object of this invention is to provide a tree harvesting apparatus having means for automatically effecting engagement of a tree trunk in response to movement of the tree from a standing position to a horizontal position following a cutting of the tree.

Still another object of this invention is to provide an operable tree grasping means including delimbing means and having depth engaging means for the delimbing means.

Yet another object of this invention is to provide a tree harvesting apparatus which includes independently adjustable delimbing arms operable for movement along the tree trunk of a felled tree.

A further object of this invention is to provide a tree harvesting apparatus having means for urging the trunk of a felled tree into contact with the ground in response to a traversing movement of delimbing means over the tree trunk.

Another object of this invention is to provide a power driven delimbing wheel.

A still further object of this invention is to provide a tree harvesting apparatus having means detailed in location for independently contacting a number of surface portions of a tree trunk and for effecting traversing movement along the tree trunk in a delimbing operation.

An additional object of this invention is to provide a tree harvesting apparatus which is simple in construction, economical to manufacture and reliable in performance.

These and other objects and advantages in the details of construction will become apparent upon reading the accompanying description of the illustrative embodiments embodying the principles of the present invention, with reference to the attached drawings wherein like reference numerals have been used to refer to like parts throughout the several FIGS. and wherein:

DESCRIPTION OF THE FIRST ILLUSTRATIVE EMBODIMENT

Figure 1:
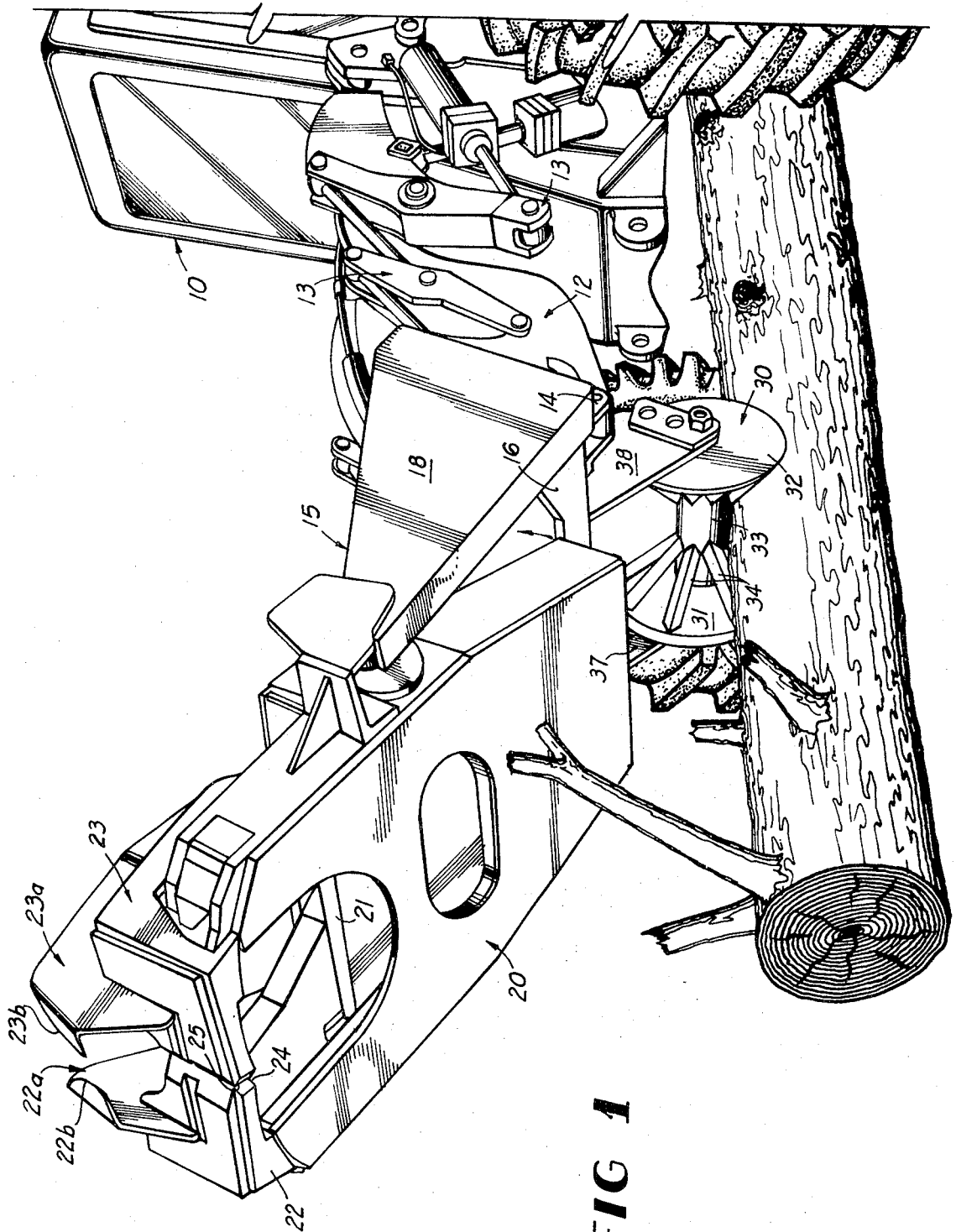
FIG. 1 is a perspective view of one embodiment of the tree harvesting apparatus mounted on a transport vehicle and supported in abutting engagement with the trunk of a felled tree.
Figure 2:
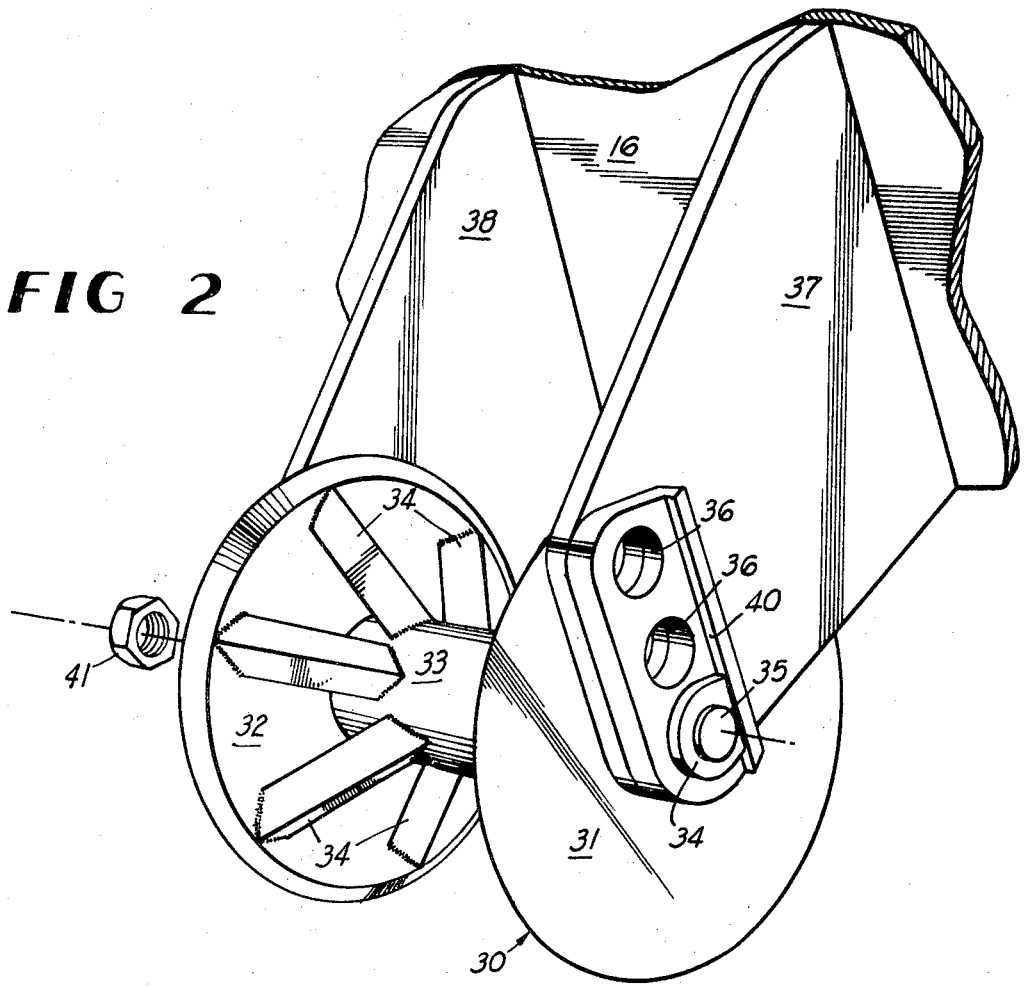
FIG. 2 is an enlarged right rear perspective view of the delimbing wheel shown in FIG. 1.
Figure 3:
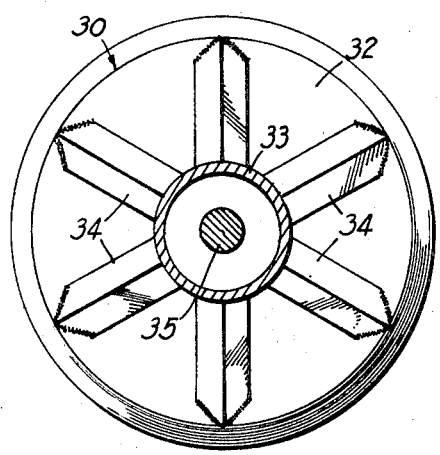
FIG. 3 is a vertical transverse sectional view taken substantially through a mid portion of the delimbing wheel of FIG. 2.

Referring now particularly to FIGS. 1-3, a first illustrative embodiment embodying the principles of the present invention will be described with reference to a tractor support vehicle 10, carrier frame means 15, cutter frame assembly means 20 and delimbing means 30.

As shown in FIG. 1, the tractor support vehicle 10 is of a conventional construction having a number of hydraulically operated linkage control mechanisms 13. The vehicle linkage control mechanisms are operable for effecting operation of a mounting frame assembly 12. The mounting frame assembly 12 defines a transverse pivot 14 for pivotally supporting the carrier frame 15. Carrier frame 15 is constructed to form a substantially U-shaped frame having a base portion 16 which is pivotally mounted at 14 to the mounting frame 12. Extended forwardly from base frame 16 is a pair of parallelly arranged legs 18, only one of which is shown in FIG. 1. The forward ends of legs 18 defines a second transverse pivot 17 for pivotally receiving the cutter frame assembly 20.

Cutter frame assembly 20 includes a reciprocally operable shear blade 21 mounted for movement from a rearwardly retracted inoperable position, shown in FIG. 1, to a forwardly extended cutting position. Cutter frame assembly 20 also includes a pair of arms 22, 23 which are pivotally supported on the cutter frame assembly for movement about laterally spaced vertical axis.

Arms 22, 23 are operable for movement from an open position allowing a tree to be received within the notched cutting area of the cutting frame assembly and movable to a closed position, surrounding the back side of the tree, to provide a backup means for the shear blade 21. Arms 22, 23 are provided with projecting tree grasping elements 24, 25, respectively which are detailed to be selectively engaged with the trunk of a fallen tree for use in skidding the fallen tree to a remote location.

Each of the arms 22, 23 are provided with delimbing fins 22a, 23a located on an upper surface thereof. The delimbing fins 22a, 23a have sharpened upper edges which can be used in a delimbing operation, as will be described herein below in a second embodiment of the tree harvesting apparatus. Fins 22a, 23a are also provided with inwardly directed tip portions having a sloping cutting edge 22b, 23b which are effective for engaging the trunk of a tree as the tree falls after being cut. The fin engagement with a tree trunk is sufficient to hold a tree during a skidding operation.

Carrier frame 15 is supported on mounting frame 12 for adjusted movement about axis 14 by conventional means (not shown). The cutter frame assembly 20 is also supported on carrier frame 15 for movement about transverse axis 17 by conventional hydraulic actuating means. The reciprocally operable shear blade 21 is supported and operable in a reciprocating cutting movement by a hydraulic control cylinder, and arms 22, 23 are also provided with hydraulic control means for effecting movement of the arms about the spaced vertical axis. Reference is made to the above mentioned copending application, Ser. No. 782,626 filed Dec. 10, 1968, for the details of construction of the hydraulic control means for effecting the above indicated operations.

As shown in FIGS. 1-3, the delimbing means includes a delimbing wheel 30. Delimbing wheel 30 is constructed of a pair of axially spaced circular plate means 31, 32 which are fixed to opposite ends of a drum or sleeve element 33. Delimbing wheel 30 also includes a number of spoke elements 34 which are arranged in circumferentially spaced relationship around drum 33 and plates 31, 32. One end of each of the spokes is connected by conventional means, such as welding, to the peripheral edge of the plate members 31, 32 with an opposite end of the spoke being connected to the surface of drum 33.

Delimbing wheel 30 is supported for rotary movement on the tree harvesting apparatus by means of a shaft 35 which extends through the drum 33, and with opposite ends of the shaft being supported in a selected one of a number of vertically spaced and aligned openings 36 which are formed in a pair of rearwardly extending arms 37, 38. Arms 37, 38 are fixed to the back surface of carrier frame base member 16 and extend rearwardly in parallel relationship therefrom. Arms 37, 38 extend slightly downward below the bottom surface of carrier frame 15. The vertically spaced openings 36 were formed in concentrically aligned relationship in each of the extended ends of arms 37, 38 for receiving the supporting shaft 35. Shaft 35 includes a formed head member 39 detailed for abutting engagement with a flange 40 to prevent rotary movement of the shaft within the supported openings 36. Shaft 35 is secured in a locked position within the supporting arms 37, 38 by means of a conventional locking nut 41.

The above described relationship will permit vertical adjustment of the delimbing wheel 30 to a selected one of the aligned openings 36. The delimbing wheel, including plates 31, 32, drum 33 and spoke 34, are detailed to perform a delimbing operation in response to rotary contact with the wheel on an upper surface of the trunk of a felled tree. A traversing movement of a delimbing wheel 30 will remove limbs located in the path thereof by providing a combination of a shearing and breaking action between the delimbing wheel and limbs on a tree.

OPERATION

The above described illustrative embodiment of the tree harvesting apparatus, as shown in FIGS. 1–3, is utilized to perform a number of tree harvesting operation. In a tree harvesting operation, the tree harvesting apparatus will be maneuvered into position by vehicle 10 whereby a tree desired to be harvested will be received within the forwardly directed slot of the cutter frame assembly 20. A standing tree is received within the cutter frame assembly by lowering the cutter frame assembly into substantially parallel relationship with the supporting ground, moving arms 22, 23 to an open position and thereafter driving the vehicle 10 forward to position a tree to be cut within the forwardly directed slot immediately in front of the shearing blade 21. After a tree has been received in the cutter frame assembly as indicated above, arms 22, 23 are moved to a closed position surrounding the tree trunk on an opposite side from the cutter blade 21. With a tree locked in position within the cutter frame assembly, a forward movement of shear blade 21 will effect a shearing of the standing tree from its supported base trunk means. After a tree has been severed by the shear blade 21, the tree will be allowed to fall away from the supporting vehicle into abutting contact with the supporting ground surface. After the tree has been felled by the shear 21, arms 22, 23 are moved to an open position maneuvered into position adjacent opposite sides of a base portion of the felled tree trunk and then arms 22, 23 are closed causing members 24, 25 to engage and grasp the tree trunk adjacent the base portion thereof.

With the tree firmly gripped by arms 22, 23, the tree is then removed by skidding to a remote location. After the tree has been moved to a desired location, a delimbing operation is performed by elevating the supporting frame means 12, 15 to a position above the felled tree trunk, lowering the supporting frame means a sufficient distance to allow the delimbing wheel 30 to come into abutting contact with the upper surface of the tree trunk. A delimbing operation is effected by maneuvering vehicle 10 to effect a traversing movement of delimbing wheel 30 over the upper surface of the tree trunk, substantially as shown in FIG. 1. A traversing movement of delimbing wheel 30 over the trunk of a felled tree will break or shear any limbs located in the path thereof.

DESCRIPTION OF A MODIFIED DELIMBING WHEEL

Figures 4, 5:
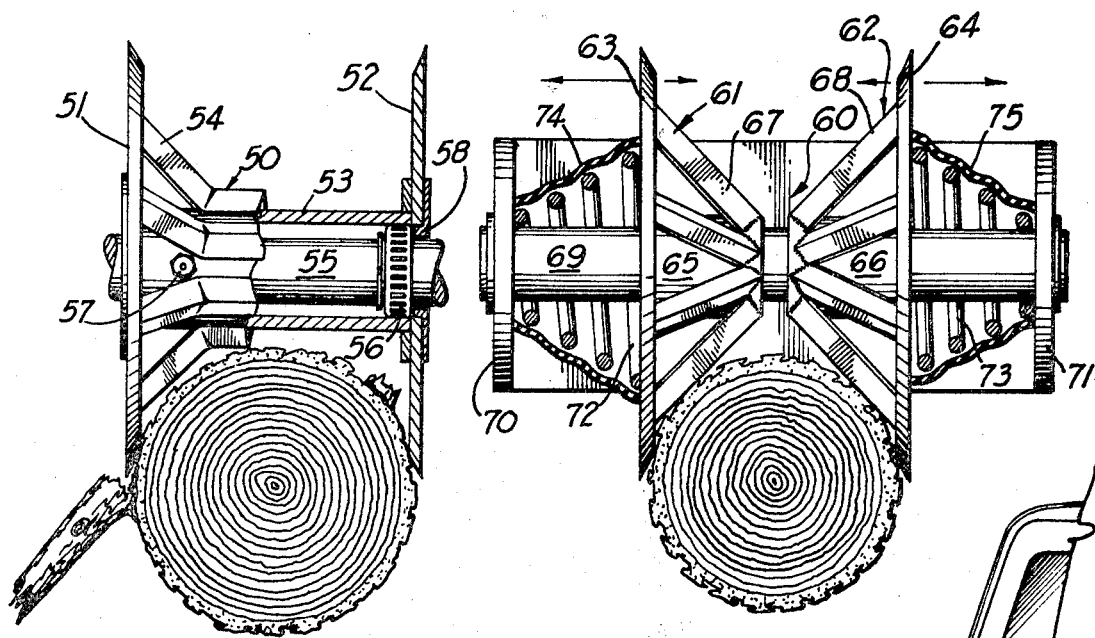
FIG. 4 is a transverse elevational view of a modified delimbing wheel, with certain parts broken away and shown in section for purpose of clarity.
FIG. 5 is a transverse elevational view of still another modified delimbing wheel.

Referring now particularly to FIG. 4, a modified delimbing wheel 50 is shown which can be utilized in a traversing movement over a tree trunk to remove limbs therefrom, in a manner as described herein above with regard to the first delimbing wheel 30.

As shown in FIG. 4, the delimbing wheel 50 is constructed of a pair of axially spaced circular plate means 51, 52 which are fixed to opposite ends of a drum or sleeve element 53. Delimbing wheel 50 also includes a number of spoke elements 54. Spokes 54 are arranged in circumferentially spaced relationship around drum 53 and plates 51, 52. Each of the spoke elements 54 is constructed of an angular member, with one end of each of the spokes connected by conventional means such as welding, to the peripheral edge of plate member 51 and including a first portion extending angularly downward to the surface of the drum 53, with a second portion of the spoke extending axially along the surface of the drum and including a third portion extending angularly upward with the extending end being connected to the peripheral edge of plate member 52.

Delimbing wheel 50 is supported for rotary movement on the tree harvesting apparatus by means of a shaft 55 which extends through drum 53. Opposite ends of shaft 55 are supported by bracket means (not shown) on the tree harvesting apparatus, in a manner similar to supporting delimbing wheel 30. Delimbing wheel 50 is rotatably supported on shaft 55 by means of a pair of conventional bearing means 56, only one of which is shown in FIG. 4. Bearings 56 are located adjacent each of the axially extending edges of drum 53. Drum 53 includes grease fitting means 57 for introducing a predetermined amount of grease into the cavity formed between drum 53 and shaft 55. Conventional grease seal means 58 is operatively associated with shaft 55 and bearings 56 for retaining the grease within the internal cavity of drum 53 and for keeping debris or dirt away from bearings 56.

DESCRIPTION OF AN ADDITIONAL EMBODIMENT OF A DELIMBING WHEEL

Referring now particularly to FIG. 5, an additional embodiment of a delimbing wheel 60 is provided embodying the principles of the present invention. Delimbing wheel 60 is capable of traversing movement along a tree trunk and including means for adjusting the effective axial dimensions thereof whereby the delimbing wheel will automatically adjust to the contour of a tree trunk. The delimbing wheel 60 includes a pair of wheel elements 61, 62. Each of the wheel elements 61, 62 is constructed of a circular plate means 63, 64, respectively, which are fixed to one axial edge of drum or sleeve elements 65, 66, respectively. The peripheral edge of plates 63, 64 include a beveled or sharpened edge which will improve the delimbing operation.

Each of the delimbing wheel elements 61, 62 include a number of spoke elements 67, 68 arranged in circumferentially spaced relationship round their respective drums 65, 66 and plates 63, 64, respectively. One end of spokes 67, 68 are connected by conventional means, such as welding, to the peripheral edge of their respective plate members with opposite ends of the spokes being connected to the surface of their respective drums adjacent an opposite axial edge thereof.

Opposite ends of support shaft 69 are supported on a tree harvester apparatus by bracket means 70, 71. The axial dimensions of shaft 69 and axial dimensions of drum elements 65, 66 are detailed whereby the wheel elements 61, 62 are axially movable relative to each other along the surface of supporting shaft 69. A first compression spring 72 is located around shaft 69 between brackets 70 and plates 63. A second compression spring 73 is located around shaft 69 between bracket 71 and plate 64. The pair of compression springs 72, 73 will effect a spring biasing movement of delimbing wheel elements 61, 62 to an inward axial limit position. In an inward axial limit position of delimbing wheels 61, 62 the axial edges of drums 65, 66 will be in abutting contact with each other. Springs 72, 73 are detailed in a coiled relationship whereby the wheel elements 61, 62 can be moved to a maximum axially displaced position with plates 63, 64 adjacent brackets 70, 71, respectively. Dust cover means 74, 75 are provided around compression spring 72, 73 for keeping debris and dust particles away from the surface of supporting shaft 69, to ensure a smooth axial sliding surface for the delimbing wheel elements 61, 62.

The angular orientation of spokes 67, 68 form a substantially V-shaped surface between the delimbing wheel elements 61, 62. When the delimbing wheel elements 61, 62 are urged into contact with the surface of a tree trunk, the angular relationship of spokes 67, 68 will wedge wheel elements 61, 62 axially on shaft 69 until the plate elements 63, 64 are in substantially abutting contact with the lateral sides of a log, as shown in FIG. 5. Should a delimbing operation be performed on a tapered log, the compression springs 72, 73 will effect an axial movement inwardly of wheel elements 61, 62 as the delimbing wheel moves from a first wide diameter area to a narrow diameter area thereby ensuring that the delimbing wheel plate means 63, 64 will be maintained in contact with the log surface throughout the length thereof.

DESCRIPTION OF A MODIFIED ARRANGEMENT OF A TREE HARVESTING AND DELIMBING APPARATUS

Figure 6:
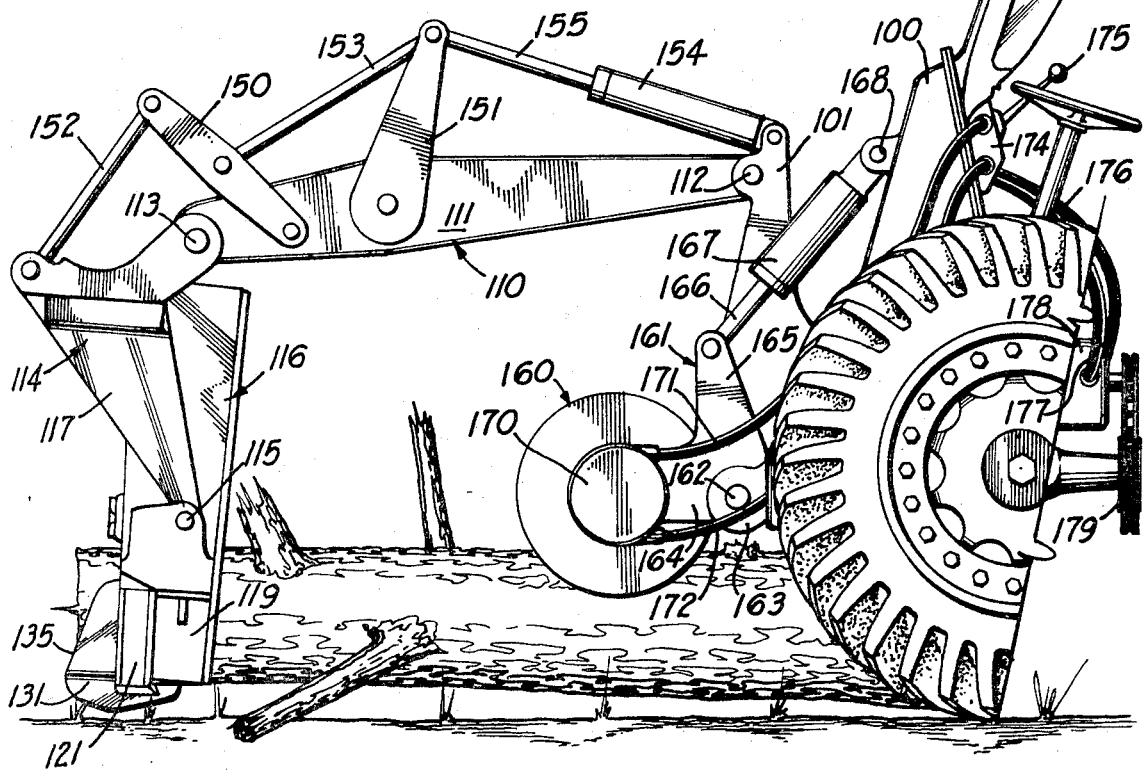
FIG. 6 is a side elevational view showing a modified arrangement of the tree harvesting apparatus and delimbing means.
Figure 7:
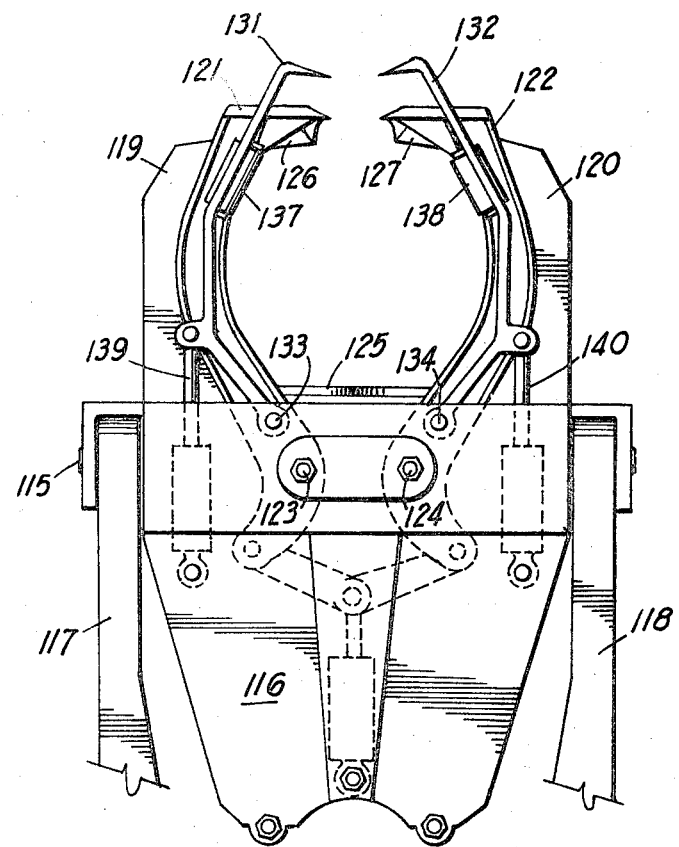
FIG. 7 is a fragmentary plan view of the cutter frame assembly and delimbing means shown in FIG. 6.
Figure 8:
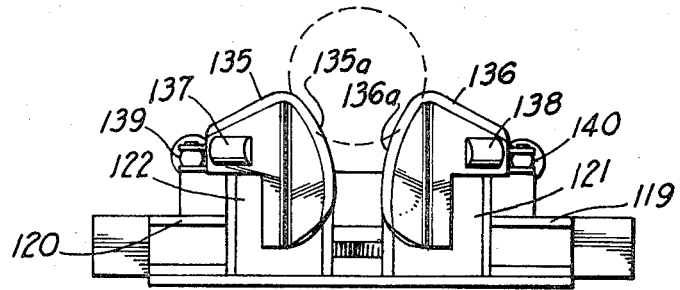
FIG. 8 is an elevational view as seen from the top of FIG. 7, showing a felled tree supported for movement in a skidding operation.

Referring now particularly to FIGS. 6—8, a modified arrangement of the tree harvesting apparatus embodying principles of the present invention is shown. The modified tree harvesting apparatus of FIGS. 6-8 will be described with reference to a conventional vehicular support means 100 having a vehicular attachment frame means 101 operable for pivotally supporting a tree harvesting frame assembly 110 for movement in a vertical plane.

As shown in FIG. 6, the tree harvesting apparatus frame means includes a first elongated frame element 111. Frame element 111 is pivotally supported at 112 to the vehicular frame support means 101. An extended opposite end of frame element 111 is pivotally connected at 113 to a yoke-type subframe 114. The yoke-type subframe 114 is pivotally attached at 115 to a cutter frame assembly 116 of the tree harvesting apparatus. The pivotal axes 112, 113 and 115 are arranged substantially parallel to each other and in a substantially horizontal relationship whereby the frame element 111 yoke frame 114 and cutter frame 116 can be moved in a vertical plane relative to the vehicular support frame means 101.

The yoke frame means 114 includes a pair of arms 117, 118, as shown in FIG. 7, which extend along opposite side edges of the cutter frame assembly 116.

Cutter frame assembly 116 includes a pair of forwardly directed frame elements 119, 120 which extend forwardly therefrom and are laterally spaced relative to each other to define a forwardly open notch there between capable of receiving a tree trunk. A pair of arm grasping means 121, 122 are pivotally supported at 123, 124, respectively, for movement about laterally spaced parallel axis. The length and shape of arms 121, 122 are detailed such that they can be moved about pivots 123, 124 between a closed position, as shown in FIG. 7 wherein the arms serve as a backup for a tree in a cutting operation and can be moved to an open position permitting a tree trunk to be inserted therein or removed therefrom. A reciprocally operable shear blade means 125 is supported in carrier frame means 116 for movement from a rearwardly retracted position, as shown in FIG. 7, to a forwardly extending cutting position.

Cutter frame assembly 116 is supported on the yoke frame 117 for adjustment about axis 115 by conventional hydraulic means (not shown). The reciprocally operable shear blade 125 is supported and operable in a reciprocating cutting movement by hydraulic control cylinders (not shown). Reference is made to the above mentioned copending application, Ser. No. 782,696 filed Dec. 10, 1968, for the details of construction of the hydraulic control means for effecting the above indicated operation of the pivotal arm movement, the reciprocating cutter blade movement and the control movement of the cutter frame assembly 116 relative to the yoke frame assembly.

As shown in FIGS. 7 and 8, arm grasping means 121, 122 are provided with delimbing fins or arms 131, 132, respectively. The delimbing arms 131, 132 are pivotally supported on an upper surface of each of the arm grasping means 121, 122 for pivotal movement about horizontally spaced axes 133, 134. Each of the delimbing arms 131, 132 are provided with sharpened or beveled cutting edges 135, 136 which extend along a length of the upper surface thereof and merge with downwardly converging sharpened surface portions 135a, 136a. Delimbing arms 131, 132 are operable for movement from an open position allowing the tree to be received within the notched cutting area between grasping arms 121, 122 and a closed position surrounding a substantial portion of the tree trunk along the opposite side and a back portion thereof.

Delimbing arms 131, 132 are provided with roller means 137, 138 which are rotatably supported thereon by conventional means and detailed to serve as inward limit position of the sharpened cutting edge relative to the trunk of a tree in a delimbing operation. The roller depth engaging means 137, 138 will prevent the sharpened edges 135, 136 from digging into the tree trunk. Delimbing arms 131, 132 are provided with conventional hydraulic control cylinder means 139, 140 for effecting movement of the delimbing arms between the open and closed positions. The hydraulic control means 139, 140 are supported on the arm grasping means 121, 122 whereby a movement of the arm grasping means 121, 122 between their open and closed position will also effect a corresponding movement of the delimbing arms between an open and closed position. Conventional valve control means (not shown) are operatively associated with the hydraulic cylinders 139, 140 for maintaining a biasing pressure of the delimbing arms 131, 132 against a tree trunk during a delimbing operation.

As shown in FIG. 8, the downwardly converging cutting edges 135a, 136a of the delimbing arms 135, 136 will provide a substantially V-shaped slot means. In a tree harvesting operation, a tree that has been severed by the reciprocally operable cutting blade 125 will fall forward or across the arm grasping means 121, 122 and the delimbing arms 131, 132. Due to the weight of the tree, the tree trunk supported in the V-shaped slot will engage the cutting edges 135a, 136a of the slot sufficiently to allow the tree to be skidded to a remote location by the transport vehicle 100.

As shown in FIG. 6, a power operable linkage system is provided for effecting pivotal movement of frame element 111 and yoke frame means 114 in a vertical plane about pivots 112, 113, respectively. The linkage system includes a pair of levers 150, 151. Each of the levers 150, 151 are pivotally connected to frame element 111 for movement about axes substantially parallel to the pivot axes 112, 113. A first link 152 is connected to an extended end of lever 150 and an extended end of yoke frame means 114. A second link means 153 is connected to an extended end of lever 151 and to intermediate portion of lever 150. The linkage control system includes a hydraulic control cylinder 154 having a piston rod 155. Cylinder 154 is connected adjacent its base portion to vehicle frame support means 101 with an extended end of piston rod 155 being connected to an extended end of lever 151. Conventional hydraulic control means (not shown) is provided for effecting operation of cylinder 154 and piston rod 155. Cylinder 154 and piston rod 155 are detailed for effecting pivotal movement of the levers 150, 151 and yoke frame means 154 through various positions of pivotal movement in a vertical plane utilizing the interconnecting link members 152, 153.

As shown in FIG. 6, a delimbing wheel 160 is provided for cooperation with the delimbing arms 131, 132 for effecting a substantially complete delimbing operation of a tree lying on the ground. Delimbing wheel 160 is pivotally mounted on the transport vehicle 100 by means of a pair of bell crank frame members 161, (only one of which has been shown in the drawing; however, it is to be understood that a second bell crank lever similar to lever 161 would be provided on an opposite axially spaced side of delimbing wheel 160. Bell crank frame members 161 are pivotally attached at 162 to a bracket means 163. Bracket means 163 are provided on the vehicular frame 100. Bell crank frame means 161 includes a first arm portion 164 which has an extended end thereof for pivotally and rotatably supporting the delimbing wheel 160. A second arm means 165 extends away from arm 164 at substantially right angles thereto. An extended end of arm 165 is pivotally connected to an extended end of a piston rod means 166 which is reciprocally operable in a conventional hydraulic cylinder means 167. The base portion of cylinder 167 is connected to a vehicular frame bracket means 168.

Operation of the hydraulic cylinder 167 will effect movement of frame means 161 about pivot axis 162. Pivotal movement of frame 161 about axis 162 will allow the delimbing wheel 160 to be moved to a desired vertically set position relative to the upper surface of a tree lying on the ground. Delimbing wheel 160 can be constructed in a manner similar to either of the above delimbing wheels 30, 50, or 60, with the only difference being that a power drive means is provided for effecting rotation of the delimbing wheel 160. The power drive means includes a hydraulic motor means 170 operatively connected to the delimbing wheel support shaft. Operation of the hydraulic motor means 170 is controlled by means of a high pressure supply line 171 and a return line 172. The hydraulic lines 171, 172 are operatively connected to a control valve means 174. Control valve means 174 includes a conventional control lever 175. A high pressure supply line 176 is provided for effecting a flow of high pressure fluid from pump means 178 to valve 174. A return line 177 is provided for returning fluid from fluid motor 170 to hydraulic pump means 178. Hydraulic pump 178 is of conventional construction and is driven by a chain and sprocket drive means 179 operative from a conventional power takeoff drive means (not shown) provided on the transport vehicle 100.

OPERATION

In operation of the tree harvesting apparatus shown in FIGS. 6–8, transport vehicle 100 is maneuvered into position adjacent a standing tree and the hydraulic control system is operated to position frame element 111 in a forwardly and downwardly extending direction, with the cutter frame assembly 116 positioned in a substantially horizontal plane adjacent the base of a standing tree. The hydraulic control means is operated to effect movement of arms 121, 122 to their open position whereby the transport vehicle can be moved forward to allow the standing tree to be received within the cutting notch area located between frame elements 119, 120, substantially as shown by the dotted lines in FIG. 7.

After the vehicle and cutter frame assembly have been maneuvered into position with a tree located in a cutting position, the arm means 121, 122 are moved to a closed position surrounding the back side of a tree. The shear blade means 125 is then operated to effect a shearing of the tree adjacent the supporting ground surface. After the tree has been severed from its base tree trunk, the tree will fall over the edges of delimbing arms 131, 132 with the weight of the tree trunk effecting a biting engagement of the tree trunk with V-shaped cutting edges 135a, 136a.

With the felled tree trunk effectively gripped between V-shaped cutting edges 135a, 136a, the transport vehicle 100 is operated in a reverse direction to effect a skidding movement of the felled tree to a remote location. After the felled tree is located in a remote area, a tree delimbing operation is initiated by maneuvering the transport vehicle 100 into position with rear wheel means thereof located on opposite sides of tree trunk and with the delimbing wheel 160 located directly above the base portion of the felled tree trunk. After the transport vehicle 100 has been properly positioned relative to a felled tree, the tree harvesting frame means 111, 114 and 116 are moved to a position substantially as shown in FIG. 6 whereby the cutter frame assembly is positioned substantially perpendicular to the longitudinal axis of the felled tree. Pivotal movement of the frame elements 111, 114, 116 is effected by means of the hydraulic control cylinder 167 and by means of the hydraulic control cylinders connected between yoke frame 114 and cutter frame 116, which hydraulic cylinder means is disclosed in the above mentioned copending application.

After the cutter frame assembly has been positioned above a felled tree, and with the tree grasping arms 121, 122 and delimbing arms 131, 132 moved to an open position, the cutter frame assembly 116 is lowered into position whereby the tree trunk will be received within the cutting notched area formed between frame elements 119, 120. With the tree trunk properly received between frame elements 119, 120, the tree grasping arms 121, 122 are moved to a closed position which will effect a corresponding movement of delimbing arms 131, 132 to a closed delimbing position. After the delimbing arms 131, 132 are moved to a delimbing position, the roller gauge means 137, 138 will contact a surface portion of the tree trunk to provide a guiding engagement of the sharpened edges 135, 136 over the tree trunk.

With the cutter frame assembly, including delimbing arms 131, 132 located in a proper delimbing position, as indicated above, the delimbing wheel 160 is lowered into abutting contact with the upper surface of the tree trunk, as shown in FIG. 6. Before a delimbing operation is started, hydraulic control cylinder 167 is actuated to apply pressure to the upper surface of the tree trunk to force the base end of the tree trunk into frictional engagement with the ground supporting surface. The purpose of applying pressure to the upper surface of the tree trunk is to prevent the tree from skidding forward due to the forward movement of the delimbing wheel and the cutter frame assembly 116.

A delimbing operation is effected on a tree properly positioned relative to delimbing wheel 160 and cutter frame assembly 161, as shown in FIG. 6, by maneuvering the transport vehicle 100 to the left thereby sliding the delimbing arms 131, 132 along the surface of the tree trunk and severing any limbs located in their path during the traversing movement. The delimbing wheel 160 can either be driven or allowed to free-wheel during a forward movement over the tree trunk. A forward traversing movement of the delimbing wheel over the surface of the tree trunk will sever any limbs located on the tree in the path of the delimbing wheel.

As the machine advances over the tree trunk in a delimbing operation, the force required to sever the limbs from the trunk by the delimbing arms 131, 132 will tend to slide the felled tree forward. This is overcome by the friction created between the tree base end and the ground. The pressure that creates this friction is applied by the delimbing wheel 160 through its hydraulic control cylinder 167. Thus, it will supply the same force to the trunk as the machine moves forward, even though the tree trunk size diminishes. This, coupled with the lift ability of the cutter assembly 116 and the natural limberness of the tree as its diameter diminishes, will supply adequate frictional pressure for most delimbing operations. The rollers 137, 138 built into the delimbing arms 131, 132 will keep the sharpened edges from biting into the tree trunk in a delimbing operation. In addition, the hydraulic control cylinders 139, 140 will be operated to maintain the delimbing arms in close cutting engagement with the tree trunk thereby ensuring that the limbs are cut in close proximity to the tree trunk.

On certain species of trees, the friction created between the tree base and the ground may not be sufficient to keep the tree from sliding during the delimbing operation. To overcome this, a controlled power rotation of the delimbing wheel 160 is effected by the hydraulic motor 170. Rotation of the delimbing wheel 160 is effected in a counter clockwise direction, as shown in FIG. 6, with the speed of rotation controlled to correspond to the speed of advancement of the transfer vehicle 100. During a controlled rotation of the de-limbing wheel 160, the spoke means of the delimbing wheel will bite into the surface of the tree trunk and provide additional frictional force to keep the tree trunk from sliding during a delimbing operation. After the cutter assembly 116 with delimbing arms 131, 132 has been advanced over the surface of the tree to the topping point of the tree, the shear blade 125 is actuated and the remaining top of the tree is sheared from the trunk.

The above described traversing movement of the transport vehicle and the tree harvester in a delimbing operation can be effected on a return of the tree harvester to the remaining standing trees to be harvested, thereby eliminating any wasted motion. The tree harvesting apparatus shown in FIG. 6 can be constructed to utilize either of the delimbing wheels 30, 50 or 60 and the delimbing wheel means can either be provided with the hydraulic controlled drive means or can be supported thereon for free wheeling, depending on the type of trees being harvested.

It has been indicated above that a tree will be skidded to a remote location before a delimbing operation is performed. However, it is to be noted that such a delimbing operation could be performed immediately adjacent the area where the standing tree was cut.

It now becomes apparent that the illustrative embodiments described and shown herein above are capable of obtaining the above stated objects and advantages. It is obvious that those skilled in the art may make modifications in the details of construction without departing from the spirit of the invention which is to be limited only by the scope of the appended claims.

What is claimed is:

1. A tree harvesting apparatus for use in removing limbs from a tree in a harvesting operation comprising in combination:

a. a frame support means, said frame support means detailed to include attachment means whereby said frame means can be attached to a transport vehicle capable of providing traversing movement of said frame support means;

b. operative delimbing means mounted on said frame support means said delimbing means detailed in design to remove limbs from a felled tree in response to a traversing movement of said delimbing means over said felled tree and wherein said traversing movement is provided by movement of said frame support means from a transport vehicle; and c. said apparatus being characterized in that said delimbing means includes a delimbing wheel, said delimbing wheel being rotatable on said frame support means and including means for removing limbs from a felled tree on the ground in response to a traversing movement of said rotatable wheel over the trunk of said felled tree.

2. A tree harvesting apparatus as described in claim 1 further characterized in that said rotatable wheel includes means for adjusting said wheel to a number of selected positions on said frame support means.

3. A tree harvesting apparatus as described in claim 1 further characterized in that said delimbing wheel includes a pair of axially spaced plate members fixed to a rotatable drum element and wherein a number of angularly disposed spoke members are connected adjacent one end at the peripheral edge of said plate members and converge inwardly and are connected at their opposite ends to the rotatable drum member.

4. A tree harvesting apparatus as described in claim 1 further characterized in that said delimbing wheel includes means for adjusting the effective delimbing dimensions thereof whereby said delimbing wheel is effective for moving limbs from a number of various diameter tree trunks.

5. A tree harvesting apparatus as described in claim 4 further characterized in that said adjusting means includes means for automatically moving said delimbing wheel to an effective delimbing dimension in response to engagement of said delimbing wheel with the surface of said tree trunk and automatically changing the effective delimbing dimensions thereof in response to traversing movement of said delimbing wheel along the surface of a tapered tree trunk.

6. A tree harvesting apparatus as described in claim 5 further characterized in that said delimbing wheel includes a pair of axially spaced plate means, said rotatable plate means including a peripheral edge operative for severing limbs from a tree trunk in response to said traversing movement therealong and wherein said plate means are axially adjustable relative to each other to a number of selected positions and wherein said delimbing wheel includes means for biasing said plate means to an inward axial limit position relative to each other, said plate means including means for automatically moving said plate means to an axially displaced set position in response to a rolling pressure contact with said plate means with the surface of a felled tree trunk.

7. A tree harvesting apparatus as described in claim 6 further characterized in that said means for supporting said delimbing wheel includes means for adjusting said delimbing wheel to a number of vertically adjusted positions above a felled tree and including power operable means for lowering said delimbing wheel onto the trunk of said felled tree to effect said rolling pressure engagement of said delimbing wheel with said felled tree trunk.

8. A tree harvesting apparatus as described in claim 1 further characterized in that said delimbing wheel includes a pair of axially spaced plate members fixed to a rotatable drum element and wherein a number of angularly spaced spoke elements are connected to said drum elements and extend along a portion of the length thereof with opposite ends of each of said spoke elements angularly disposed relative to the surface of said drum element with the outer ends thereof connected adjacent the peripheral edges of said plate members.

9. A tree harvesting apparatus for use in removing limbs from a tree in harvesting operation comprising in combination:
a. a first delimbing means operable for removing limbs from a portion of a felled tree in response to a traversing movement of said delimbing means along the trunk of said felled tree;
b. a second delimbing means operable for removing limbs from additional portions of said felled tree in response to a traversing movement of said delimbing means along said tree trunk; and
c. means for supporting said first and second delimbing means on a transport vehicle capable of providing said traversing movement of said delimbing means relative to said felled tree;
d. said apparatus being characterized in that said first delimbing means includes a delimbing wheel, said delimbing wheel being rotatable on said supporting means for severing limbs from a felled tree lying on the ground in response to said traversing movement of said rotatable wheel along the trunk of said felled tree.

10. A tree harvesting apparatus as described in claim 9 further characterized in that said first delimbing wheel includes power operable means for effecting rotation of said delimbing wheel during said traversing movement along said felled tree trunk.

11. A tree harvesting apparatus as described in claim 9 further characterized in that said delimbing wheel includes means for adjusting the effective delimbing dimensions thereof whereby said delimbing wheel is effective for moving limbs from a number of various diameter tree trunks.

12. A tree harvesting apparatus as described in claim 11 further characterized in that said adjusting means includes means for automatically moving said delimbing wheel to an effective delimbing dimension in response to engagement of said delimbing wheel with the surface of said tree trunk and wherein said automatic adjusting means is effective for automatically changing the effective delimbing dimensions thereof in response to traversing movement of said delimbing wheel along the surface of a tapered tree trunk.

13. A tree harvesting apparatus as described in claim 12 further characterized in that delimbing wheel includes a pair of axially spaced plate means, said rotatable plate means including a peripheral edge operative for severing limbs from a tree trunk in response to said traversing movement therealong and wherein said plate means are axially adjustable relative to each other to a number of selected positions and wherein said delimbing wheel includes means for biasing said plate means to an axial limit position relative to each other, said plate means including means for automatically moving said plate means to an axially displaced set position in response to a rolling pressure contact with said plate means with the surface of a felled tree trunk.

14. A tree harvesting apparatus as described in claim 14 further characterized in that said means for supporting said delimbing wheel includes means for adjusting said delimbing wheel to a number of vertically adjusted positions above a felled tree and including power operable means for lowering said delimbing wheel onto the trunk of said felled tree to effect said rolling pressure engagement of said delimbing wheel with said felled tree trunk.

15. A tree harvesting apparatus as described in claim 9 further characterized in that said delimbing wheel includes a pair of axially spaced plate members fixed to a rotatable drum element and wherein a number of angularly spaced yoke elements are connected to said drum elements and extend along a portion of the length thereof with opposite ends of each of said spoke elements angularly disposed relative to the surface of said drum element with the outer ends thereof connected adjacent the peripheral edges of said plate members.

16. A tree harvesting apparatus as described in claim 9 further characterized in that said means supporting said second delimbing means includes operative tree shearing means for severing a standing tree and allowing said severed tree to fall to the ground.

17. A tree harvesting apparatus as described in claim 16 further characterized in that said second delimbing means includes means for automatically engaging the surface of said felled tree trunk in response to said tree falling to the ground, said engaging means effective for holding said tree for skidding said tree to a location remote from the area of said standing tree.

18. A tree harvesting apparatus for use in removing limbs from a tree in a harvesting operation comprising, in combination:
   a. a delimbing wheel operative for removing limbs from a portion of a felled tree in response to a traversing movement of said delimbing wheel along the trunk of said felled tree;
   b. means for supporting said delimbing wheel on a transport vehicle capable of providing said traversing movement, said delimbing wheel supporting means includes means for moving said delimbing wheel to a vertically adjusted position above a felled tree and means for lowering said delimbing wheel onto the trunk of said felled tree;
   c. a pair of tree grasping arm means, means for pivotally supporting said tree grasping arm means in laterally spaced relationship relative to each other for pivotal movement from an open position permitting a tree trunk to be moved there between and to a closed position surrounding a substantial portion of said tree trunk, said space between said tree grasping arm means defining a passageway through which a tree trunk can move in a delimbing operation, severing means located on said pivotal arm means for engaging a limb extending from the trunk of a tree located in said passageway for severing the limbs therefrom in response to an axial displacement of a tree trunk through said passageway; and
   d. frame support means operative for supporting said tree grasping arms on a transport vehicle capable of providing a traversing movement thereof relative to a felled tree trunk whereby a tree trunk located in said passageway can be axially displaced therethrough in response to a traversing movement of said transport vehicle.

19. A method of harvesting trees including the steps of:
   a. moving a tree grasping means into position surrounding a standing tree adjacent the base thereof;
   b. closing said tree grasping means around said tree trunk;
   c. severing said standing tree adjacent said base, allowing said severed tree to fall to a substantially horizontal position on the supporting ground surface;
   d. engaging the trunk of said felled tree in response to said tree falling to said horizontal position on the supporting ground surface;
   e. skidding said felled tree to a location remote from the stump portion of said felled tree while continuing said engagement of said tree trunk;
   f. moving said tree engaging means to an open position allowing said tree trunk to rest on the supporting ground surface;
   g. moving a first delimbing means into contact with a first portion of said felled tree trunk;
   h. moving said arm grasping means into contact with additional portions of said felled tree trunk; and
   i. traversing the trunk of said felled tree while lying on the ground with said first delimbing means and said tree grasping means to remove the limbs located thereon in the path of said delimbing means and said tree grasping means in response to said traversing movement.

20. A method of harvesting trees as described in claim 19 including a further step of:
   j. driving said first delimbing mans at a speed corresponding to the speed of said traversing movement and simultaneously applying a pressure with said first delimbing means to an upper portion of said tree trunk to cause said tree trunk to frictionally engage the ground supporting surface.

* * * * *